April 14, 1964

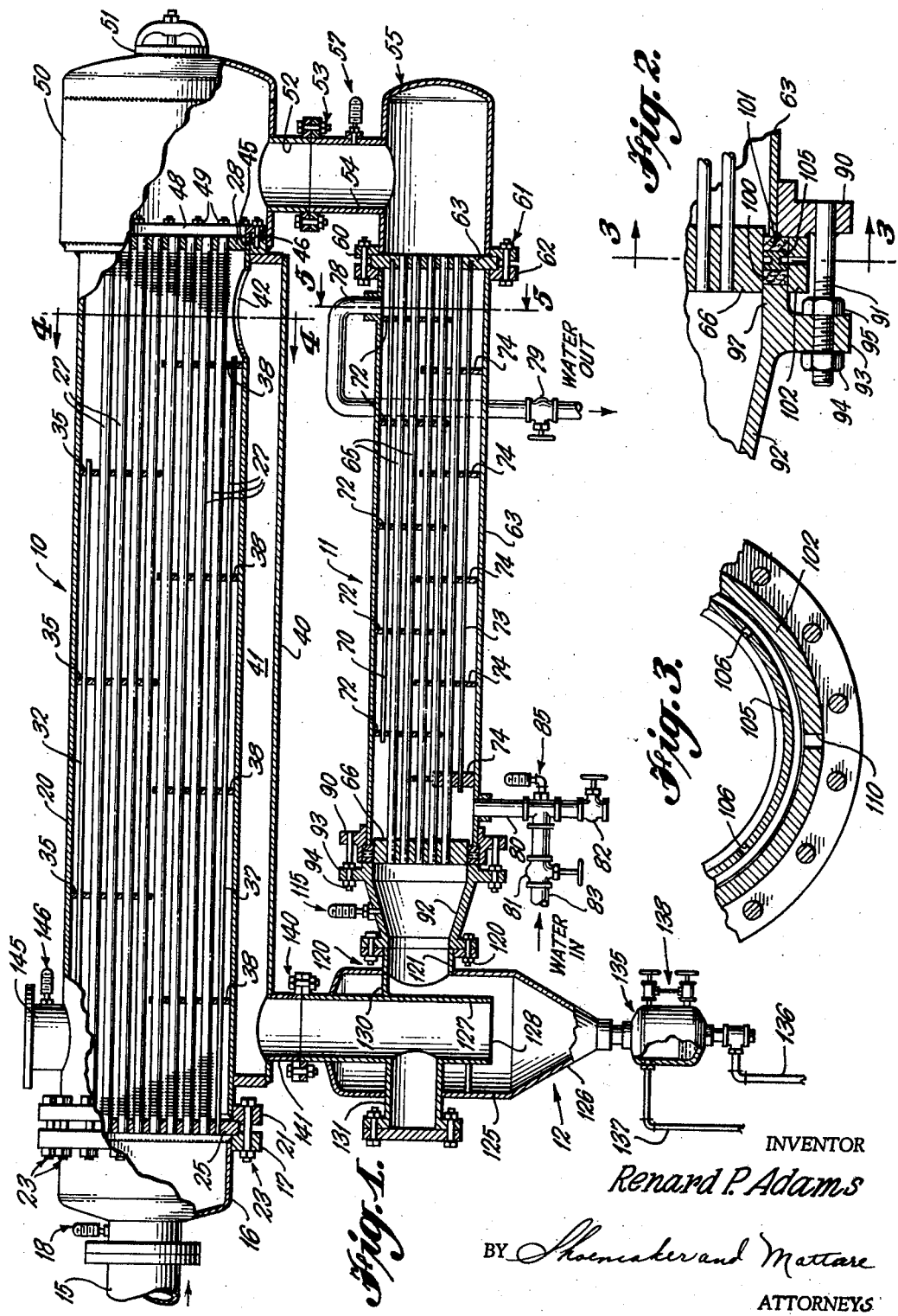

R. P. ADAMS 3,129,077

GAS PURIFYING APPARATUS

Filed May 23, 1961

INVENTOR
Renard P. Adams

BY Shoemaker and Mattare
ATTORNEYS

United States Patent Office 3,129,077
Patented Apr. 14, 1964

3,129,077
GAS PURIFYING APPARATUS
Renard P. Adams, 87 Nottingham Terrace,
Buffalo 16, N.Y.
Filed May 23, 1961, Ser. No. 112,003
4 Claims. (Cl. 55—269)

The present invention relates to new and novel gas purifying apparatus, and more particularly to gas purifying apparatus associated with air compressors and the like.

In general, the intake air of conventional compressors contains a certain amount of moisture, and to this is added oil vapor as the air passes through the compressor, the oil vapor being present due to the fact that various portions of the compressor are lubricated with oil. As a result, the compressed gas at the outlet of the compressor contains water vapor and oil vapor which is quite undesirable. It therefore becomes necessary and in some cases absolutely essential to remove as much of the oil and water vapor as possible before the compressed gas is fed into some sort of consuming apparatus.

The present invention provides an arrangement wherein a single compact and relatively inexpensive unit is provided for firstly efficiently purifying the compressed air by removing substantially all of the water and oil vapor present in the compressed gas. In addition, the apparatus of the present invention serves a second highly important function which serves to increase the efficiency of the over-all operation.

In most applications, the compressed gas is cooled so as to cause condensation of moisture and oil from the compressed gas, and the so condensed liquid is then removed in a suitable separator means. The purified gas is then fed directly to the consuming apparatus at the lowered temperature.

The present invention serves to increase the efficiency of the operation by reheating the purified air, utilizing the heat of the gas as it comes from the compressor for this purpose whereby the volume of the purified air is increased a substantial amount.

It is apparent that the increase in volume will result in a corresponding increase in the amount of useful work which the purified gas can perform, thereby accordingly substantially increasing the efficiency.

It has been found in actual practice that by so reheating the purified air, the useful volume of air may be increased as much as ⅓ more than would be available without such reheating. This will result in approximately ⅓ more useful work in the utilizing apparatus.

By so elevating the temperature of the purified gas, a further advantage accrues in that it ensures that additional vapor will not be precipitated within the working apparatus which utilizes the compressed gas. In this connection, it is noted that compressed gas expands as it does useful work in the air consuming apparatus thereby creating a refrigerating effect due to such expansion which, of course, lowers the temperature of the gas. The purified gas of the present invention will not be lowered to a temperature at which additional vapor would condense, and accordingly, this is a further advantage due to the reheating of the purified gas. It is noted that this feature is particularly important when the gas is utilized in glass container making equipment since the presence of any water or oil vapor in such equipment is highly objectionable.

The present invention employs a novel combination of elements including first and second heat exchanger means, each of which defines first and second fluid flow paths therethrough. The hot compressed gases from the compressor enter the first fluid flow path of the first heat exchanger means at a temperature of approximately 310° to 350° F. in a typical installation. These hot compressed gases pass through the first heat exchanger and lose some of their heat to gas flowing through the second fluid flow path thereof. The compressed gas is then fed into the second heat exchanger means which employs a cooling medium such as water for substantially lowering the temperature of the gas to a point where the water and oil vapor will condense. The cooled gas is then fed into a separating means which is adapted to separate liquid from gas and may preferably be in the form of a cyclone type separator which removes liquids through centrifugal action.

The separated liquid is suitably removed from the separator means, and then purified gas is fed through the second fluid flow path of the first heat exchanger means. As the purified gas moves along this last-mentioned fluid flow path, its temperature is increased such that by the time it reaches the gas outlet from the first heat exchanger means, its temperature has been raised back to approximately 250° F.

The second heat exchanger means of the present invention employs a novel sealing means in the form of a pair of packings having a vent ring interposed therebetween, this vent ring serving to vent the packings to atmosphere. In addition, a packing gland which holds the packings in place is mounted in a novel manner upon the main body of the second heat exchanger means such that even pressure may be applied to the packing, and furthermore, the packing gland may be quickly and easily adjusted. Furthermore, this mounting serves to isolate the packing gland from stresses normally occurring in the system.

An object of the present invention is to provide new and novel gas purifying apparatus adapted to be associated with compressors and the like, and which effectively removes water vapor and oil vapor from compressed gas.

A further object of the invention is the provision of gas purifying apparatus which increases the volume of the purified gas to increase the efficiency of the work done by the over-all system.

A still further object of the invention is to provide gas purifying apparatus including novel means to vent the packings of one of the heat exchanger means and to further provide a novel mounting for the packing gland associated with the aforementioned packings.

A still further object of the invention is to provide gas purifying apparatus which is quite simple and compact in construction, and yet which is quite reliable and efficient in operation.

Other objects and many attendant advantages of the present invention will become more apparent when considered in connection with the specification and accompanying drawings, wherein:

FIG. 1 is a somewhat schematic view mostly in longitudinal section illustrating the over-all system according to the present invention;

FIG. 2 is an enlarged view of a portion of the structure shown in FIG. 1;

FIG. 3 is a view taken substantially along line 3—3 of FIG. 2 looking in the direction of the arrows;

Figure 4:
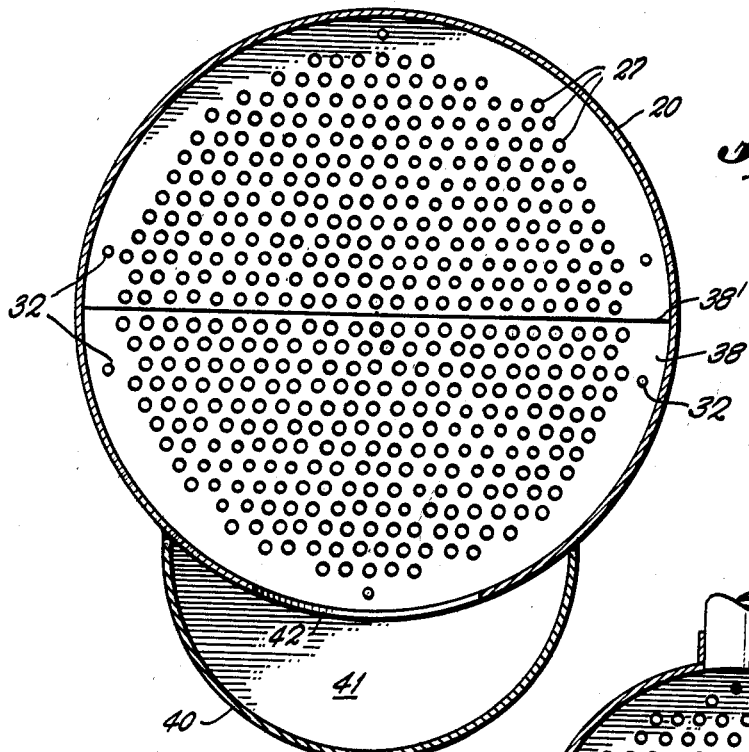
FIG. 4 is a view taken substantially along line 4—4 of FIG. 1 looking in the direction of the arrows.

Referring now to the drawings wherein like reference characters designate corresponding parts throughout the several views, FIG. 1 shows the components of the assembly in general including a first heat exchanger means indicated generally by reference numeral 10, a second heat exchanger means indicated generally by reference numeral 11, and a separator means indicated generally by reference numeral 12, these major components being connected in a novel manner to form a compact unit as will hereinafter more fully appear.

An inlet conduit 15 is connected with the output of a compressor or the like, the inlet conduit being connected in communication with a hollow inlet bonnet 16. The bonnet includes a radially extending flange 17. A thermometer 18 is connected with the inlet bonnet 16 for indicating the temperature of the compressed gas entering the first heat exchanger means. The main shell 20 of the first heat exchanger means 10 is provided with a radially extending flange 21 and a plurality of nut and bolt assemblies 23 are employed for securing the flanges 17 and 21 to one another. When the flanges are so secured to one another, a header 25 is clamped tightly therebetween.

Figure 6:
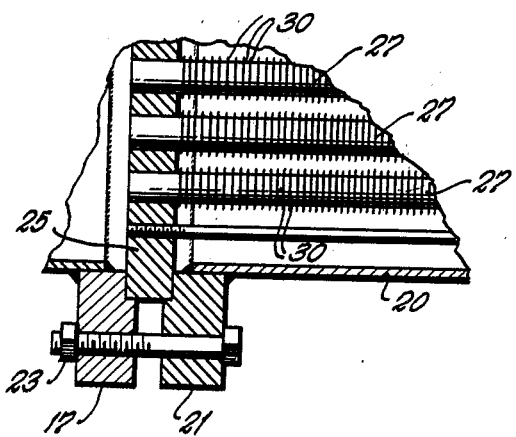
FIG. 6 is an enlarged view of another portion of the structure shown in FIG. 1.

Header 25 supports a plurality of tubular members 27 at one end thereof, the opposite ends of tubular members 27 being mounted within the opposite header 28. It will be understood that incoming gas flows through the inlet bonnet 16 and thence through the tubular members 27 which extend through each of the headers 25 and 28. Tubular members 27 are provided with a plurality of radial fins 30 disposed along the length thereof, these fins being shown most clearly in FIG. 6. The fins are for the purpose of increasing the efficiency of heat transfer between the gas flowing through the tubular members 27 and the gas which travels around the exterior of these tubular members.

A plurality of upper stay rods 32, only one of which is shown, are supported by header 25 and are disposed within the upper portion of shell 20. For example, three of these stay rods may be provided, the stay rods 32 supporting a plurality of spaced baffles 35, the baffles having openings therethrough tightly receiving the tubular members 27 extending therethrough. A plurality of lower stay rods 37, only one of which is shown, are also provided within the lower portion of the shell 20. Lower stay rods 37 may also be three in number for example and serve to support a plurality of spaced baffle members 38, these baffle members also being provided with openings therethrough which also tightly receive tubular members 27.

Referring now to FIG. 4, it will be seen that a large number of tubular members 27 are provided throughout the cross-sectional area of the hollow shell 20 of the first heat exchanger means, and it will be noted that the upper edge 38' of the baffle 38 nearest the viewer is disposed substantially along the diameter of cylindrical shell 20. The lower and upper edges of baffles 35 and 38 respectively will lie substantially in a plane, and it is evident that each of the baffles closes off approximately one half of the cross-sectional area of the shell. Obviously, with this arrangement, gas traveling within the shell about the tubular members will be forced to follow a tortuous path as it moves about the upper and lower edges of the baffles in its path through the first heat exchanger means.

It will also be noted particularly as seen in FIG. 4 that a depending wall 40 is of arcuate cross-section, and is connected to the under portion of the shell 20 and serves to define a hollow chamber 41 beneath the shell. This hollow chamber is in communication with an opening 42 formed through the wall of the shell adjacent the downstream end of the tubular members 27 and to the right of the last baffle 38 as seen in FIG. 1.

It will be noted that header 28 is more or less freely floating within the shell, and an asbestos packing 45 is provided for sealing the header 28 with respect to the shell. A plurality of studs 46 extend longitudinally of the shell, and a packing gland 48 formed in two pieces is adjustably mounted upon studs 46 by means of nuts 49. With this arrangement, it is evident that the gland 48 which is of substantially L-shaped cross-sectional configuration may be adjusted by means of the nut and stud assemblies so as to adjust the amount of compression of the packing 45.

A hollow shell cover 50 is provided at the downstream end of shell 20 and is provided with a manhole 51 for gaining access to the interior of the shell cover whereby the packing gland 48 may be adjusted. An outlet conduit 52 extends downwardly from shell cover 50, this outlet conduit being connected by nut and bolt assemblies 53 to the inlet conduit portion 54 formed on the bonnet 55 associated with the second heat exchanger means.

A thermometer 57 is connected in the conduit portion 54 for indicating the temperature of the gas entering the second heat exchanger means.

A radially extending flange 60 of bonnet 55 is connected by nut and bolt assemblies 61 to a radially extending flange 62 connected to the shell 63 of the second heat exchanger means. When the flanges 60 and 62 are operatively connected as shown, a header 63 is clamped therebetween. Header 63 serves to support one end of tubular members 65 extending longitudinally of the shell, the opposite ends of tubular members 65 being supported within a second header 66. It is evident that gas entering bonnet 55 will pass through tubular members 65 in traveling through the second heat exchanger means 11.

An upper stay rod 70 is supported by header 63, and a plurality of baffles 72 are supported upon stay rod 70, baffles 72 having openings formed therethrough which snugly receive tubular members 65. A plurality of lower stayrods 73 are supported by header 63 in the lower portion of shell 63, only one of such stay rods being shown but being for example three in number in a typical example. A plurality of baffles 74 are supported by lower stay rods 73, baffles 74 having openings formed therethrough for snugly receiving tubular members 65.

Figure 5:
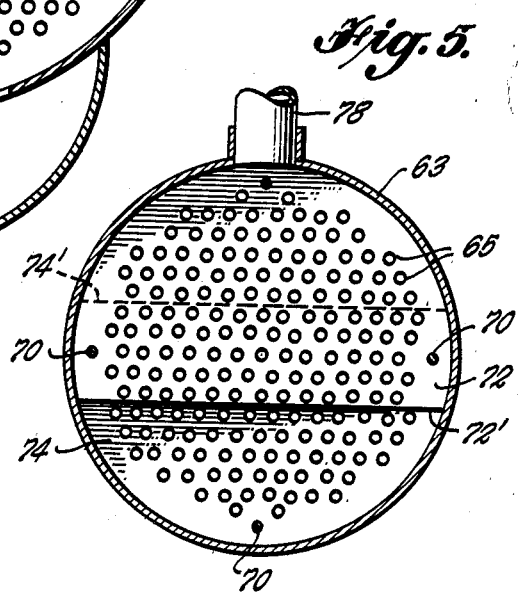
FIG. 5 is a view taken substantially along line 5—5 of FIG. 1 looking in the direction of the arrows.

Referring to FIG. 5, it will be seen that a large number of tubular members 65 is distributed throughout the cross-sectional area of the shell 63. It will also be noted that the lower edge 72' of the baffle 72 nearest the viewer extends below a horizontal plane bisecting the cylindrical shell 63 while the upper edge 74' of one of the lower baffles 74 extends above such a plane. It is accordingly evident that a cooling medium passing around tubular member 65 will follow a tortuous path around the upper and lower edges of the baffles 74 and 72 respectively.

A water outlet conduit 78 is disposed in communication with the interior of shell 63 and as seen particularly in FIG. 1, it will be noted that this fluid outlet conduit 78 is connected to the shell to the right of the righthand-most baffle 72. The water passes through conduit 78 and the control valve 79 to a suitable sump or the like. The water flow must be controlled by valve 79 such that there is maintained a full water pressure in the shell during operation.

A fluid inlet conduit 80 is disposed in communication with the interior of the shell just to the left of the lefthand-most baffle 74 which it will be noted is of heavy-duty construction. Control valves 81 and 82 are connected with the fluid inlet conduit 80 for controlling the flow into the second heat exchanger means, and conduit 83 may be connected to a suitable source of cooling medium such as water and the like. A thermometer 85 is connected in the inlet conduit 80 for measuring the temperature of the cooling medium.

As seen most clearly in FIG. 2, a radially extending flange 90 is secured to one end portion of shell 63, and a plurality of studs 91 extends longitudinally of the shell. A packing gland 92 is provided with a radially extending flange portion 93, flange portion 93 having openings receiving the outer threaded end portions of studs 91, the packing gland being retained in operative position by means of nuts 94 and lock nuts 95.

It will be noted that the header 66 is relatively free floating on the longitudinally extending annular portion 97 of the packing gland, and a pair of braided graphited asbestos packings 100 and 101 are disposed between header 66 and the longitudinally extending flange portion 102 connected with flange 90 on shell 63.

A vent ring 105 formed of metal or similar material is provided of a substantially H-shaped cross-sectional configuration and is disposed intermediate the packings 100 and 101. As seen particularly in FIG. 3, vent ring 105 is provided with a pair of radially extending openings 106 formed through the central web thereof. The flange portion 102 is provided with a vent opening 110, and it will be seen that the openings 106 are in communication with vent hole 110. This arrangement permits easy checking of the packing for leakage of gas or cooling water. If gas or cooling water is leaking by the packings, nuts 94 may be tightened up to press the packing gland more tightly against the packings to ensure effective sealing.

A thermometer 115 is connected to the packing gland 92 for measuring the outlet gas temperature from the second heat exchanger means 11. A plurality of nut and bolt assemblies 120 connect the packing gland with the inlet conduit portion 121 of the separator means 12 shown as being of the cyclone type.

Separator 12 includes a main substantially cylindrical body portion 125 having a substantially frusto-conical lower portion 126. A gas outlet pipe 127 extends downwardly below the level of the inlet conduit portion 121, the lower end 128 of outlet conduit 127 being open. A baffle 130 directs the incoming gas in a downward tangential manner so as to create a vortex within the separator in a well-understood manner.

An auxiliary outlet conduit 131 is connected with outlet pipe 127, and as shown, this outlet conduit is capped. The outlet conduit may be utilized for tapping off dry clean cold compressed gas for special services as may be required in addition to the continuous flow of gas through the outlet pipe 127 and into the first heat exchanger means. For example, where it is desired to provide a certain temperature in some processes, it may be desirable to blend variable amounts of relatively cold air as withdrawn through conduit 131 with the reheated air leaving the exit portion of the first heat exchanger means. This enables the obtaining of compressed gas temperatures lower than would otherwise be available from the outlet of the first heat exchanger means.

The action of this type of cyclone separator is well known, and the centrifugal forces developed within the separator cause the moisture to be thrown outwardly whereupon it flows downwardly along the walls of the conical portion 126 to be collected within a moisture reservoir 135. The condensate outlet 136 carries away the separated liquid, and 137 represents an equalizing air vent which may be connected with a suitable trap. A water gauge 138 is provided for readily observing the liquid level within the reservoir 135. The upper portion of outlet pipe 127 is connected by means of nut and bolt assemblies 140 to an inlet conduit portion 141 which is in communication with the lefthand portion of chamber 41 of the first heat exchanger means as seen in FIG. 1.

A gas outlet conduit 145 is disposed in communication with the upper lefthand portion of the first heat exchanger means 10 as seen in FIG. 1, and this outlet conduit may be connected with any suitable apparatus to which the compressed gas is to be directed. A thermometer 146 is provided for measuring the temperature of the outlet gas from the system.

In operation, hot compressed gas coming from a compressor or the like passes through the inlet conduit 15, and thence through the finned tubular members 27 through the first heat exchanger means 10. The hot gas then passes through the shell cover 50, the inlet bonnet 55, and tubular members 65 of the second heat exchanger means 11.

As the gas passes through the first tubular members 27 it is cooled somewhat by the counterflow of purified gas passing around tubular members 27 as it moves toward the outlet 145. The gas from the compressor is further and more substantially cooled as it passes through the tubular members 65 where the flow of cool water in a counter direction serves to effectively drop the temperature to within approximately 10° or less of the temperature of the cooling water. As the compressed gas is thus further cooled, it reaches the point of condensation such that vapor in the compressed gas starts to condense out.

The gas of such lowered temperature then passes into the separtor where the gas is separated from the liquid, and in the present example, this is illustrated as being accomplished by means of a cyclone separator. It should be understood, however, that other types of separators which are effective for separting gas and liquid could be utilized in place of the cyclone separator.

The finally purified gas then passes from the outlet of the separator means through the first heat exchanger means around the finned tubular members 27, thus reheating the purified gas to a substantial extent as pointed out previously.

It will be noted that in each case the heat exchanger means includes a first fluid path defined by the tubular members thereof such that the compressed gas passes through said tubular members in each case. In addition, each of the heat exchanger means defines a second fluid path which comprises the space around the tubular members such that fluid is allowed to flow around the tubular members in a direction counter to that of the flow through the tubular members. It will, of course, be understood that each of the heat exchanger means as well as the separator will normally be of relatively heavy-duty construction and will be made of steel or the like to withstand the pressures normally encountered during operation.

It is apparent from the foregoing that there is provided a new and novel gas purifying apparatus which is especially adapted to be associated with compressors and the like and which effectively removes water vapor and oil vapor from the compressed gas output of such apparatus. The arrangement of the present invention serves to increase the volume of the purified gas to thereby increase the efficiency of the work done by the associated compressor. Novel means is provided for venting the packings of one of the heat exchanger means and further there is provided a novel mounting for the packing glands employed with the packings such that even pressures can be applied to the packings and the packing glands may be quickly and easily adjusted.

The apparatus is relatively simple in construction and provides a compact unit which is reliable and efficient in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A gas purifying apparatus comprising first heat exchanger means including a first elongated hollow shell having header means at opposite end portions thereof and in sealing relationship thereto, a plurality of tubular members diposed within said first shell, all of such tubular members comprising a first plurality of tubular members having opposite end portions thereof supported by and in sealing relationship to said header means at opposite end portions of said first shell, first gas inlet means connected with one end of said first shell, all of said first plurality of tubular members opening at one end to said first inlet means for receiving hot gas to be purified, first gas outlet means connected with the other end of said first shell, all of said first plurality of tubular members opening at the other end thereof to said first outlet means, whereby incoming hot gas passes through said first plurality of tubular members within said first shell in only one direction, second heat exchanger means including a second elongated hollow shell having header means at opposite end portions thereof in sealing relationship thereto, a second plurality of tubular members having opposite end portions thereof supported by and in sealing relationship to said header means at opposite end portions of said second shell, second gas inlet means connected with one end of said second shell, means connecting said second gas inlet means with said first gas outlet means, all of said second plurality of tubular members opening at one end to said second inlet means for receiving gas to be purified which has passed through said first heat exchanger means, second gas outlet means connected with the other end of said second shell, all of said second plurality of tubular members opening at the other ends thereof to said second outlet means, whereby gas to be purified passes through said second plurality of tubular members within said second shell in only one direction, means for introducing a cooling medium within said second shell adjacent said other end of said second shell, outlet means for said cooling medium for removing cooling medium from said second shell adjacent said one end of said second shell, separator means connected with the second gas outlet means associated with said second shell, said separator means including a liquid outlet and a gas outlet and being adapted for separating condensed vapor from gas, the gas outlet of said separator means being connected with said first shell adjacent said other end of said first shell, and outlet means for purified gas connected with said first shell adjacent said one end of said first shell, whereby purified gas from said separator means passes through said first shell and around the first plurality of tubular members within said first shell in only one direction which is in counterflow to the direction of flow of gas through said first plurality of tubular members.

2. Apparatus as defined in claim 1 wherein all of the tubular members within said first shell are of substantially uniform size and are uniformly distributed throughout the cross sectional area of said first shell.

3. Apparatus as defined in claim 1 wherein each of said heat exchanger means includes a plurality of staggered baffles disposed within the shells of the associated heat exchanger means, said baffles being spaced longitudinally of the shells and being disposed in surrounding sealed relationship to certain ones of the tubular members within the associated shells for causing the purified gas flowing through said first shell and the cooling medium passing through said second shell to flow in a tortuous path about the tubular members in the associated shells.

4. Apparatus as defined in claim 1 wherein one end portion of said second heat exchanger means is sealed by a plurality of annular packings having an annular vent ring interposed therebetween, said vent ring having at least one substantially radially extending opening formed therethrough, said vent ring including an annular groove formed in the inner surface and an annular groove formed in the outer surface with said opening formed in said vent ring providing communication between said grooves, said second heat exchanger means including an annular portion disposed outwardly of said annular vent ring, said last-mentioned annular portion having an opening formed therethrough which is in communication with said opening in said vent ring for providing a vent to atmosphere from the area adjacent said packings.

References Cited in the file of this patent

UNITED STATES PATENTS

| 2,195,565 | Fricke | Apr. 2, 1940 |
| 2,209,661 | Pickstone | July 30, 1940 |
| 2,623,505 | Armacost | Dec. 30, 1952 |

FOREIGN PATENTS

| 1,085,172 | France | July 21, 1954 |